US010611257B2

(12) United States Patent
Moriya et al.

(10) Patent No.: US 10,611,257 B2
(45) Date of Patent: Apr. 7, 2020

(54) CONTROL APPARATUS OF ELECTRIC VEHICLE

(71) Applicant: SUBARU CORPORATION, Tokyo (JP)

(72) Inventors: Fumiyuki Moriya, Tokyo (JP); Taichi Kishida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 22 days.

(21) Appl. No.: 15/949,899

(22) Filed: Apr. 10, 2018

(65) Prior Publication Data

US 2018/0304763 A1     Oct. 25, 2018

(30) Foreign Application Priority Data

Apr. 25, 2017  (JP) ................................ 2017-085766

(51) Int. Cl.
*B60L 11/18*        (2006.01)
*B60W 20/13*        (2016.01)
(Continued)

(52) U.S. Cl.
CPC .......... *B60L 11/1862* (2013.01); *B60L 50/61* (2019.02); *B60L 58/13* (2019.02); *B60L 58/16* (2019.02);
(Continued)

(58) Field of Classification Search
CPC ...... B60L 11/1862; B60L 58/16; B60L 58/20; B60L 58/13; B60L 50/61;
(Continued)

(56) References Cited

U.S. PATENT DOCUMENTS

2010/0264878 A1   10/2010  Ueda et al.
2012/0226403 A1    9/2012  Yamamoto et al.
(Continued)

FOREIGN PATENT DOCUMENTS

JP      2010-052610 A     3/2010
JP      2010-252592 A    11/2010
(Continued)

OTHER PUBLICATIONS

Japanese Office Action, dated Mar. 26, 2019, in Japanese Application No. 2017-085766 and English Translation thereof.

*Primary Examiner* — Anne Marie Antonucci
(74) *Attorney, Agent, or Firm* — McGinn IP Law Group, PLLC

(57) ABSTRACT

A control apparatus of an electric vehicle includes a monitor determiner. The monitor determiner monitors a state of a main battery that supplies electric power directed to running, and determines whether the electric power of the main battery is usable on the basis of first information and second information. The first information is a deciding factor directed to deciding whether the electric power of the main battery is usable. The second information is a determination factor directed to determining whether the electric power of the main battery is usable. The monitor determiner determines, upon start-up of the electric vehicle, whether the electric power of the main battery is usable on the basis of the second information before the first information is calculated, and decides whether the electric power of the main battery is usable on the basis of the first information when the first information is calculated.

20 Claims, 6 Drawing Sheets

(51) Int. Cl.
*B60L 11/12* (2006.01)
*B60W 10/06* (2006.01)
*B60W 10/26* (2006.01)
*B60L 58/20* (2019.01)
*B60L 58/13* (2019.01)
*B60L 50/61* (2019.01)
*B60L 58/16* (2019.01)

(52) U.S. Cl.
CPC ............ *B60L 58/20* (2019.02); *B60W 10/06* (2013.01); *B60W 10/26* (2013.01); *B60W 20/13* (2016.01); *B60L 2240/545* (2013.01); *B60L 2240/547* (2013.01); *B60W 2510/244* (2013.01); *B60W 2510/246* (2013.01); *B60Y 2200/92* (2013.01); *Y02T 10/7005* (2013.01); *Y02T 10/7077* (2013.01); *Y02T 10/7241* (2013.01); *Y10S 903/93* (2013.01)

(58) Field of Classification Search
CPC ........ B60L 2240/547; B60L 2240/545; B60W 10/26; B60W 10/06; B60W 20/13; B60W 2510/246; B60W 2510/244; Y02T 10/7077; Y02T 10/7241; Y02T 10/7005; Y10S 903/93; B60Y 2200/92
See application file for complete search history.

(56) References Cited

U.S. PATENT DOCUMENTS

2013/0024069 A1* 1/2013 Sakamoto .......... G01R 31/3647
701/36
2016/0214503 A1 7/2016 Orita

FOREIGN PATENT DOCUMENTS

| JP | 2011-057140 | A | 3/2011 |
| JP | 2012-183850 | A | 9/2012 |
| JP | 2014-218130 | A | 11/2014 |
| JP | 2015-131565 | A | 7/2015 |
| JP | 2016-068673 | A | 5/2016 |
| JP | WO2015/052807 | A1 | 3/2017 |

* cited by examiner

CONTROL APPARATUS OF ELECTRIC VEHICLE

CROSS-REFERENCE TO RELATED APPLICATIONS

The present application claims priority from Japanese Patent Application No. 2017-085766 filed on Apr. 25, 2017, the entire contents of which are hereby incorporated by reference.

BACKGROUND

The technology relates to a control apparatus of an electric vehicle.

There are electric vehicles with a traction motor and an engine, such as hybrid electric vehicles (HEVs) or plug-in hybrid electric vehicles (PHEVs). A typical electric vehicle includes a main battery and a sub-battery. The main battery supplies electric power to the traction motor, whereas the sub-battery supplies electric power to other electrical parts.

A certain type of electric vehicle controls its operation mode by switching between an engine operation mode and an engine non-operation mode, depending on a state of the main battery. In the engine operation mode, the electric vehicle runs with the engine operating. In the engine non-operation mode, the engine stops, and the electric vehicle runs on the power of the traction motor. Performing the control in this manner enables the electric vehicle to, even when a remaining amount of electric power charged in the main battery is lowered during the running in the engine non-operation mode, continue to run by operating the engine while charging the main battery with the engine power. Furthermore, when any abnormality occurs in the main battery during the running in the engine non-operation mode, the electric vehicle is able to continue to run by starting up the engine.

Japanese Unexamined Patent Application Publication (JP-A) No. 2014-218130 discloses a technique in which a traveling mode of an electric vehicle is switched on the basis of: chargeable power Win that indicates a limit of chargeable electric power of a main battery; dischargeable power Wout that indicates a limit of dischargeable power of the main battery; a state of charge (SOC); and a battery temperature. Reference is made to FIG. 13 of JP-A No. 2014-218130.

Japanese Unexamined Patent Application Publication (JP-A) No. 2015-131565 discloses a technique in which a sub-battery is charged with electric power of an electric generator when an engine operates, whereas the sub-battery is charged with electric power of a main battery when the engine stops.

SUMMARY

An aspect of the technology provides a control apparatus of an electric vehicle. The control apparatus includes a monitor determiner configured to monitor a state of a main battery that supplies electric power directed to running, and determine whether the electric power of the main battery is usable on a basis of first information and second information. The first information is a deciding factor that is directed to deciding whether the electric power of the main battery is usable, and the second information is a determination factor that is directed to determining whether the electric power of the main battery is usable. The monitor determiner is configured to determine, upon start-up of the electric vehicle, whether the electric power of the main battery is usable on the basis of the second information before the first information is calculated, and decide whether the electric power of the main battery is usable on the basis of the first information when the first information is calculated.

An aspect of the technology provides a control apparatus of an electric vehicle. The control apparatus includes circuitry configured to monitor a state of a main battery that supplies electric power directed to running, determine whether the electric power of the main battery is usable on a basis of first information and second information, in which the first information is a deciding factor that is directed to deciding whether the electric power of the main battery is usable, and the second information is a determination factor that is directed to determining whether the electric power of the main battery is usable, determine, upon start-up of the electric vehicle, whether the electric power of the main battery is usable on the basis of the second information before the first information is calculated, and decide whether the electric power of the main battery is usable on the basis of the first information when the first information is calculated.

DETAILED DESCRIPTION

Figure 1:
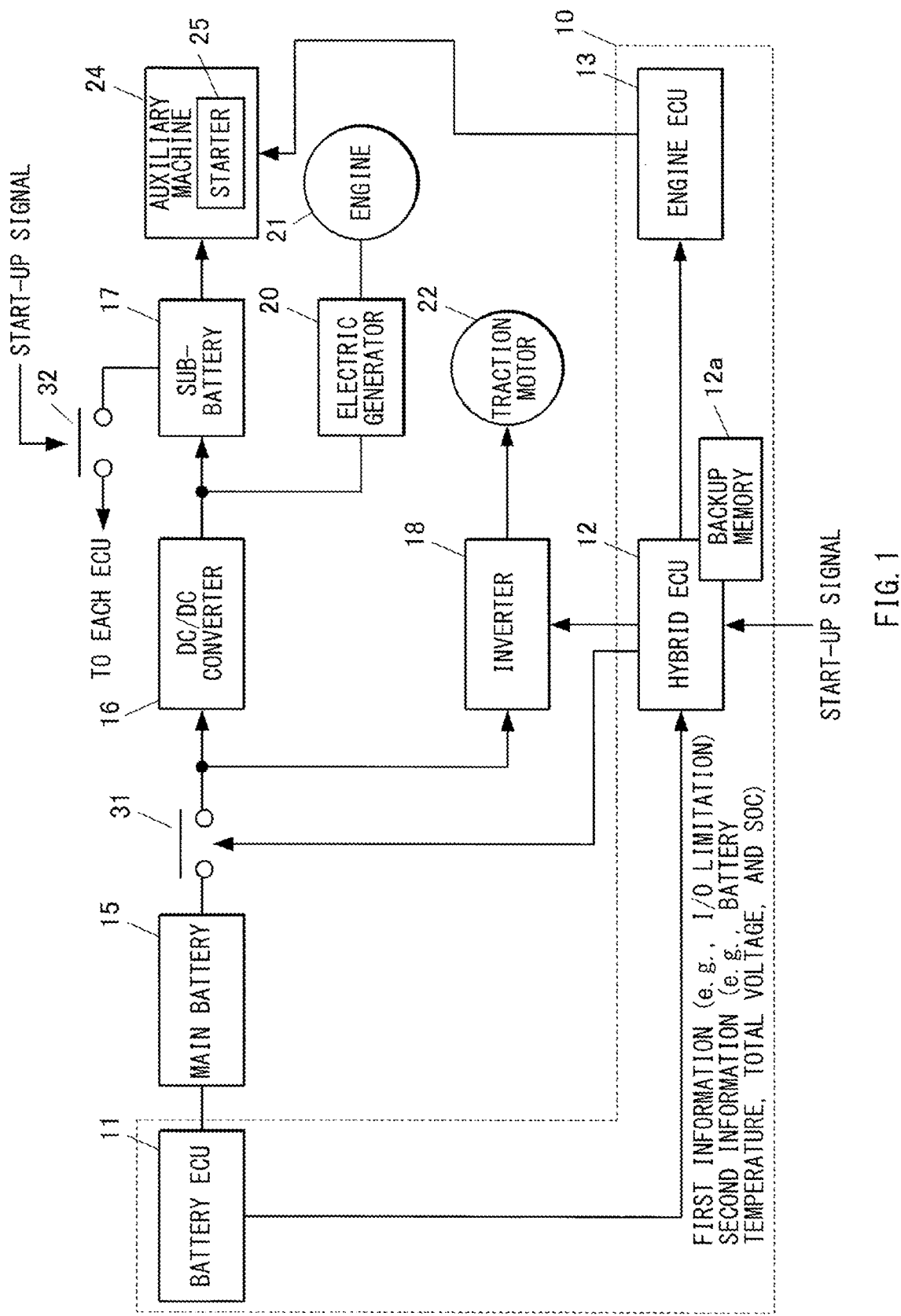
FIG. 1 is a control block diagram of an example of an electric vehicle equipped with a control apparatus according to one implementation of the technology.

In the following, some non-limiting implementations of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

It has been desired that electric vehicles be able to determine whether electric power of a main battery is usable swiftly and appropriately upon start-up. What is expected for the electric vehicles is to allow for making of the determination on whether the electric power of the main battery is usable upon the start-up further swiftly and appropriately.

It is desirable to provide a control apparatus of an electric vehicle which is able to swiftly and appropriately determine whether electric power of a main battery is usable when the electric vehicle starts up.

With reference to the accompanying drawings, an implementation of the technology is described below in detail.

FIG. 1 is a control block diagram of an electric vehicle equipped with a control apparatus according to one implementation of the technology.

The electric vehicle according to an example implementation may be an hybrid electric vehicle (HEV) or a plug-in hybrid electric (PHEV), for example. The electric vehicle may be operable to switch its operation mode between an engine operation mode and an engine non-operation mode. In the engine operation mode, the electric vehicle may run on power of an engine 21. In the engine non-operation mode, the engine 21 may stop, and the electric vehicle may run on power of a traction motor 22. Referring to FIG. 1, the electric vehicle may be equipped with a control apparatus 10. The control apparatus 10 may include a battery electric control unit (ECU) 11, a hybrid ECU 12, and an engine ECU 13. In one implementation, the engine ECU 13 may be referred to as an "engine control unit (ECU)". The electric vehicle may include a main battery 15, a main relay 31, a sub-battery 17, a relay 32, the engine 21, an auxiliary machine 24, an electric generator 20, the traction motor 22, an inverter 18, and a DC/DC converter 16. In one implementation, the battery ECU 11 and the hybrid ECU 12 may serve as a "monitor determiner". In one implementation, the battery ECU 11 may serve as a "battery monitoring unit". In one implementation, the hybrid ECU 12 may serve as a "determiner", a "switching controller", and a "threshold setting unit".

The engine 21 may burn its fuel to generate power. The generated power may be transmitted to wheels through an unillustrated clutch and an unillustrated transfer mechanism. The engine 21 may start up in response to driving of a starter 25, which may be a part of the auxiliary machine 24. The engine ECU 13 may adjust a rotational speed and torque of the engine 21 by controlling the auxiliary machine 24. Part of the power of the engine 21 may be transmitted to the electric generator 20. With this power, the electric generator 20 may charge the sub-battery 17.

The traction motor 22 may be electrically driven to generate power, which then may be transmitted to the wheels through the clutch and the transfer mechanism. The traction motor 22 may be driven by means of electric power output from the inverter 18.

In accordance with a torque instruction from the hybrid ECU 12, the inverter 18 may convert electric power of the main battery 15, and may supply the converted electric power to the traction motor 22. In accordance with a negative torque instruction from the hybrid ECU 12, the inverter 18 may convert braking energy of the traction motor 22 into a regenerative current, and may supply this regenerative current to the main battery 15 to charge the main battery 15.

The main battery 15 may be a secondary battery such as a lithium-ion battery. The main battery 15 may supply electric power to the traction motor 22 to drive the traction motor 22. In one implementation, the main battery 15 may be referred to as a "high-voltage battery". The main battery 15 may apply the inverter 18 and the DC/DC converter 16 with a voltage, such as 100 V, that is higher than that of the sub-battery 17. If a remaining amount of the electric power charged in the main battery 15 is lowered or if any abnormality occurs in the main battery 15, for example, the electric power of the main battery 15 may possibly become unusable. The main battery 15 may be charged with the regenerative current from the traction motor 22 or the power from the engine 21. In an example implementation, while the electric vehicle is running on the power of the engine 21, the engine ECU 13 may couple the traction motor 22 to the wheels through the clutch, and the hybrid ECU 12 may give the negative torque instruction to the inverter 18. As a result, the traction motor 22 may supply, to the main battery 15, a charge current based on the power of the engine 21. In an example implementation, the engine 21 may be provided with an unillustrated electric generator that generates electricity on the basis of the power of the engine 21. This electric generator may charge the main battery 15 with the charge current based on the power of the engine 21.

The main relay 31 may make or break a current path along which an output current of the main battery 15 flows, under the control of the hybrid ECU 12. When the main relay 31 is turned on or "closed", the main battery 15 may apply a voltage to both the inverter 18 and the DC/DC converter 16.

The battery ECU 11 may monitor states of the main battery 15, and adjust cell voltages and other internal properties of the main battery 15. Non-limiting examples of the states to be monitored may include: a battery temperature; a total voltage such as the total of voltages between the open terminals or the total of discharged voltages; a state of charge (SOC); chargeable power (Win); and dischargeable power (Wout). In one implementation, the term "chargeable power" may refer to an upper limit of constant electric power with which the main battery 15 is chargeable over predetermined seconds to extent that a voltage across the main battery 15 does not exceed its upper limit voltage. The term "dischargeable power" may refer to an upper limit of constant electric power that is dischargeable from the main battery 15 over predetermined seconds to extent that the voltage across the main battery 15 does not drop below its lower limit voltage. In one implementation, the dischargeable power may serve as "first information". The first information may be a deciding factor directed to deciding whether the electric power of the main battery 15 is usable. In one implementation, the battery temperature, the total voltage, and the SOC may serve as "second information". The second information is a determination factor directed to determining whether the electric power of the main battery 15 is usable. The battery ECU 11 may transmit the first information and the second information to the hybrid ECU 12 via any network, such as a controller area network (CAN). Timings of acquiring or calculating the second information and calculating the first information upon the start-up of the electric vehicle are described later in greater detail.

The sub-battery 17 may be a secondary battery such as a lead-acid battery. The sub-battery 17 may supply electric power to a plurality of ECUs, including the battery ECU 11, the hybrid ECU 12, and the engine ECU 13, and the auxiliary machine 24. In one implementation, the sub-battery 17 may be referred to as an "auxiliary battery". The sub-battery 17 may output a voltage, such as 12 V, that is lower than that of the main battery 15. The sub-battery 17 may be charged with the electric power of the electric generator 20 during the driving of the engine 21. In addition, the sub-battery 17 may also be charged with the electric power of the main battery 15 via the DC/DC converter 16 when the main relay 31 is turned on. The DC/DC converter 16 may convert a voltage received from the main battery 15 into a lower voltage, and supply a charge current to the sub-battery 17.

The relay 32 may be turned on/off to make or break an output line of the sub-battery 17. The relay 32 may be turned on or "closed" in response to a start-up signal generated by a passenger's operation of an unillustrated ignition switch or an unillustrated start button. In response to the turn-on or "closing" of the relay 32, the sub-battery 17 may supply the electric power to the plurality of ECUs, thereby starting up the electric vehicle. In response to the turn-off or "opening" of the relay 32, the sub-battery 17 may substantially stop supplying the electric power to the plurality of ECUs, thereby stopping the system of the electric vehicle.

The hybrid ECU 12 may control the switching of the operation mode of the engine 21 and the driving of the traction motor 22. To switch the operation mode of the engine 21 to the engine operation mode, the hybrid ECU 12 may turn off the main relay 31 and transmit a start-up instruction to the engine ECU 13. To switch the operation mode of the engine 21 to the engine non-operation mode, the hybrid ECU 12 may transmit an instruction for stopping the engine 21 to the engine ECU 13, turn on the main relay 31, and start controlling the driving of the traction motor 22. While controlling the driving of the traction motor 22, the hybrid ECU 12 may transmit a torque instruction to the inverter 18 in accordance with a passenger's driving operation. In this way, the hybrid ECU 12 may drive the traction motor 22 in accordance with the passenger's driving operation. The hybrid ECU 12 may receive the first information and the second information from the battery ECU 11. The hybrid ECU 12 may have a backup memory 12a in which stored data is prevented from being lost even when the power is turned off. In other words, the backup memory 12a may store the data in a nonvolatile manner.

In response to the start-up instruction from the hybrid ECU 12, the engine ECU 13 may start the engine 21 through the starter 25, and controls the auxiliary machine 24 in accordance with the passenger's driving operation. In this way, the engine 21 may be driven in accordance with the passenger's driving operation.

[Start-Up Process]

Figure 2:
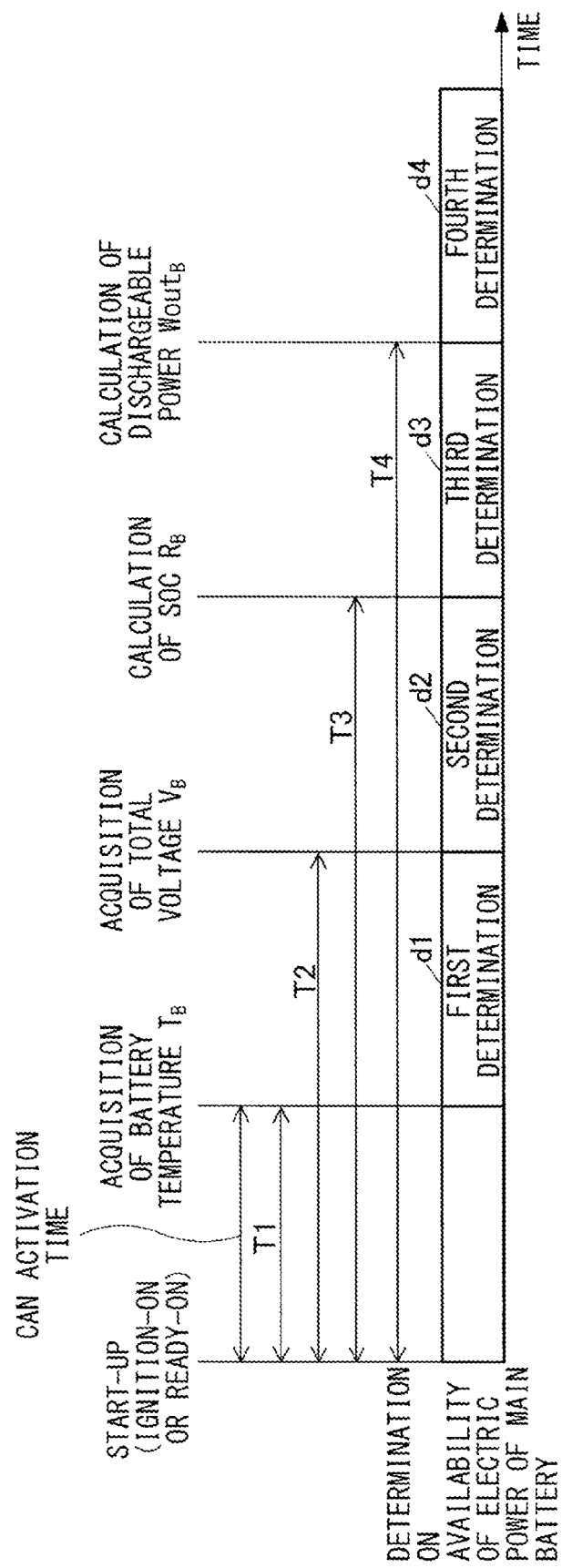
FIG. 2 is a timing chart of an example of an operation of determining whether electric power of a main battery is usable when the electric vehicle starts up.

A description is given of a start-up process performed by the electric vehicle. FIG. 2 is a timing chart of an example of an operation of determining whether the electric power of the main battery is usable upon the start-up of the electric vehicle.

Referring to FIG. 2, when the electric vehicle starts up, the hybrid ECU 12 may determine whether the electric power of the main battery 15 is usable, on the basis of a plurality of pieces of information that indicate respective states of the main battery 15. The hybrid ECU 12 may make the determination plural times, on the basis of the plurality of pieces of information. In an example implementation, the hybrid ECU 12 may make a plurality of determinations, including a first determination d1, a second determination d2, a third determination d3, and a fourth determination d4, on the basis of the plurality of pieces of information. Non-limiting examples of the plurality of pieces of information may include: information on a battery temperature $T_B$ that indicates a temperature of the main battery 15; information on a total voltage $V_B$ that indicates the total output voltage, such as the total voltage between the open terminals or the total discharge voltage, of the main battery 15; information on a SOC $R_B$ of the main battery 15; and information on a dischargeable power $Wout_B$ of the main battery 15.

The dischargeable power $Wout_B$ may be one example of the first information that serves as the deciding factor that is directed to determining whether the electric power of the main battery 15 is usable. If the dischargeable power $Wout_B$ is less than a preset threshold, the hybrid ECU 12 may decisively determine that the electric power of the main battery 15 is unusable. If the dischargeable power $Wout_B$ is greater than the threshold, the hybrid ECU 12 may decisively determine that the electric power of the main battery 15 is usable. In an alternative example implementation, the first information, which is the deciding factor for use in determining the availability of the electric power, may be a maximum allowable discharge current of the main battery 15 or other information regarding the main battery 15. In an example implementation, the first information, which is the deciding factor for use in determining the availability of the electric power, may include information on a dielectric resistance value of the main battery 15, or malfunction-related information regarding the main battery 15, such as a leakage state.

The battery temperature $T_B$, the total voltage $V_B$, and the SOC $R_B$ each may be one example of the second information that serves as the determination factor for use in determining the availability of the electric power of the main battery 15. The dischargeable power $Wout_B$, which is the first information, may be calculated from the second information by the battery ECU 11. The second information may be measurements that the battery ECU 11 acquires from sensors such as a temperature sensor, a voltage sensor, or a current sensor, or may be values that the battery ECU 11 calculates on the basis of those measurements. It is to be noted that the pieces of information included in the second information each may be information that is lower in precision than the first information in terms of the precision of the determination, to be made by the hybrid ECU 12, as to whether the electric power of the main battery 15 is usable.

As illustrated in FIG. 2, when the electric vehicle starts up, it takes times T1 to T4, which are different from each other, for the battery ECU 11 to acquire the battery temperature $T_B$ and the total voltage $V_B$, and to calculate the SOC $R_B$ and the dischargeable power $Wout_B$. This means that the hybrid ECU 12 receives current values of the respective battery temperature $T_B$, total voltage $V_B$, SOC $R_B$, and dischargeable power $Wout_B$ from the battery ECU 11 at different timings. For example, after the electric vehicle has started up and the CAN has been activated, the battery ECU 11 may transmit pieces of information on the respective battery temperature $T_B$, total voltage $V_B$, SOC $R_B$, and dischargeable power $Wout_B$ to the hybrid ECU 12 at regular intervals. It is to be noted, however, that until the initial battery temperature $T_B$ and the initial total voltage $V_B$ have been acquired and the initial SOC $R_B$ and the initial dischargeable power $Wout_B$ have been calculated, the battery ECU 11 may transmit preset initial values of the respective battery temperature $T_B$, total voltage $V_B$, SOC $R_B$, and dischargeable power $Wout_B$ to the hybrid ECU 12 as the values of the respective battery temperature $T_B$, total voltage $V_B$, SOC $R_B$, and dischargeable power $Wout_B$. This means that the hybrid ECU 12 receives the current values of the respective battery temperature $T_B$, total voltage $V_B$, SOC $R_B$, and dischargeable power $Wout_B$ on or after the timings at which the battery ECU 11 has completed the acquiring of the battery temperature $T_B$ and the total voltage $V_B$ and has completed the calculation of the SOC $R_B$ and the dischargeable power $Wout_B$. It is to be noted that the foregoing process of transmitting the pieces of information, including the battery temperature $T_B$, the total voltage $V_B$, the SOC $R_B$, and the dischargeable power $Wout_B$, is non-limiting, and any other process may be used as an example implementation.

In FIG. 2, the "start-up" refers to a timing at which a passenger turns on the ignition (i.e., "IGNITION-ON") or sets the electric vehicle to be in a ready state (i.e., "READY-ON"). In an example implementation, times T1 to T4 may be on the order of hundred milliseconds, for example. After the electric vehicle has started up, first, the battery ECU 11 may obtain the battery temperature $T_B$, the total voltage $V_B$, and the SOC $R_B$ in this order as the second information. For example, the battery ECU 11 may sequentially acquire the battery temperature $T_B$ and the total voltage $V_B$ and calculate the SOC $R_B$ as the second information upon the startup of the electric vehicle. Thereafter, the battery ECU 11 may calculate the dischargeable power $Wout_B$ as the first information. Thus, the hybrid ECU 12 may receive, from the battery ECU 11, the values of the respective battery temperature $T_B$, total voltage $V_B$, SOC $R_B$, and dischargeable power $Wout_B$ in this order that all reflect the current states of the main battery 15. As indicated by the first determination d1 to the fourth determination d4 in FIG. 2, the hybrid ECU 12 may determine whether the electric power of the main battery 15 is usable on the basis of the received information, every time the hybrid ECU 12 receives the current value of the information. On the basis of a result of the determination as to whether the electric power of the main battery 15 is usable, the hybrid ECU 12 may perform a process of selecting the operation mode of the engine 21, or a process of updating the operation mode of the engine 21.

A description is given of an example of a process by which the hybrid ECU 12 makes the plurality of determinations upon the start-up of the electric vehicle.

[First Determination d1]

When receiving the current value of the battery temperature $T_B$, the hybrid ECU 12 may compare this battery temperature $T_B$ with both a lower threshold Lth and an upper threshold Hth for the battery temperature $T_B$. In fact, using the battery temperature $T_B$ alone, it may be difficult to decisively determine whether the electric power of the main battery 15 is usable. However, if the battery temperature $T_B$ has an excessively high or low value, the dischargeable power $Wout_B$ of the main battery 15 may possibly be excessively low, in which case it is highly likely that the hybrid ECU 12 decisively determines that the electric power of the main battery 15 is unusable.

When the battery temperature $T_B$ falls within a range of the lower threshold Lth and the upper threshold Lth, the hybrid ECU 12 may determine that the electric power of the main battery 15 is usable, and may select the engine non-operation mode. When the battery temperature $T_B$ falls outside the range of the lower threshold Lth and the upper threshold Lth, the hybrid ECU 12 may determine that the electric power of the main battery 15 is unusable, and may select the engine operation mode. When selecting the engine non-operation mode, the hybrid ECU 12 may turn on the main relay 31. When selecting the engine operation mode, the hybrid ECU 12 may drive the starter 25 to start the engine 21.

[Second Determination d2]

When receiving the current value the total voltage $V_B$, the hybrid ECU 12 may compare this total voltage $V_B$ with a preset threshold Vth. In fact, using the total voltage $V_B$ alone, it may be difficult to decisively determine whether the electric power of the main battery 15 is usable. However, if the total voltage $V_B$ has an excessively low value, the dischargeable power $Wout_B$ of the main battery 15 may possibly be excessively low, in which case it is highly likely that the hybrid ECU 12 decisively determines that the electric power of the main battery 15 is unusable.

When the total voltage $V_B$ is greater than the threshold Vth, the hybrid ECU 12 may determine that the electric power of the main battery 15 is usable. When the total voltage $V_B$ is equal to or less than the threshold Vth, the hybrid ECU 12 may determine that the electric power of the main battery 15 is unusable. In accordance with a result of this determination as to whether the electric power of the main battery 15 is usable, the hybrid ECU 12 may update the operation mode of the engine 21. In an example implementation, when determining that the electric power of the main battery 15 is usable, the hybrid ECU 12 may designate the engine non-operation mode as a candidate for an operation mode to be selected. When determining that the electric power of the main battery 15 is unusable, the hybrid ECU 12 may designate the engine operation mode as a candidate for an operation mode to be selected. It is to be noted that, in the stage of the second determination d2, a control program may permit the hybrid ECU 12 only to update the operation mode so that the engine non-operation mode is switched to the engine operation mode. In other words, the control program may prohibit the hybrid ECU 12 from updating the operation mode so that the engine operation mode is switched to the engine non-operation mode. For example, the hybrid ECU 12 may be allowed to update the operation mode, only on a condition that the engine non-operation mode has been already selected most previously and the engine operation mode has been designated as a candidate on the basis of the determination result. When updating the operation mode, the hybrid ECU 12 may turn off the main relay 31, and drive the starter 25 to start the engine 21.

[Third Determination d3]

When receiving the current value of the SOC $R_B$, the hybrid ECU 12 may compare this SOC $R_B$ with a preset threshold Rth. In fact, using the SOC $R_B$ alone, it may be difficult to decisively determine whether the electric power of the main battery 15 is usable. However, if the SOC $R_B$ has an excessively low value, the dischargeable power $Wout_B$ of the main battery 15 may possibly be excessively low, in which case it is highly likely that the hybrid ECU 12 decisively determines that the electric power of the main battery 15 is unusable.

When the SOC $R_B$ is greater than a preset threshold Rth, the hybrid ECU 12 may determine that the electric power of the main battery 15 is usable. When the SOC $R_B$ is equal to or less than the threshold Rth, the hybrid ECU 12 may determine that the electric power of the main battery 15 is unusable. In accordance with a result of this determination as to whether the electric power of the main battery 15 is usable, the hybrid ECU 12 may update the operation mode of the engine 21. In an example implementation, when determining that the electric power of the main battery 15 is usable, the hybrid ECU 12 may designate the engine non-operation mode as a candidate for an operation mode to be selected. When determining that the electric power of the main battery 15 is unusable, the hybrid ECU 12 may designate the engine operation mode as a candidate for an operation mode to be selected. It is to be noted that, in the stage of the third determination d3, the control program may permit the hybrid ECU 12 to update the operation mode so that the engine non-operation mode is switched to the engine operation mode, but may prohibit the hybrid ECU 12 from updating the operation mode so that the engine operation mode is switched to the engine non-operation mode. For example, the hybrid ECU 12 may be allowed to update the operation mode, only on a condition that the engine non-operation mode has been already selected most previously and the engine operation mode has been designated as a candidate on the basis of the determination result. When updating the operation mode, the hybrid ECU 12 may turn off the main relay 31, and drive the starter 25 to start the engine 21.

[Fourth Determination d4]

When receiving the current value of the dischargeable power $Wout_B$, the hybrid ECU 12 may compare this dischargeable power $Wout_B$ with a preset threshold Wth. When the dischargeable power $Wout_B$ is greater than the threshold Wth, the hybrid ECU 12 may decisively determine that the electric power of the main battery 15 is usable. When the dischargeable power $Wout_B$ is equal to or less than the threshold Wth, the hybrid ECU 12 may decisively determine that the electric power of the main battery 15 is unusable. In accordance with a result of this decisive determination as to whether the electric power of the main battery 15 is usable, the hybrid ECU 12 may update the operation mode of the engine 21. It is to be noted that, in the stage of the fourth determination d4, the control program may permit the hybrid ECU 12 to update the operation mode so that the engine non-operation mode is switched to the engine operation mode, and may also permit the hybrid ECU 12 to update the operation mode so that the engine operation mode is switched to the engine non-operation mode. When updating the operation mode so that the engine non-operation mode is switched to the engine operation mode, the hybrid ECU 12 may turn off the main relay 31, and drive the starter 25 to start the engine 21. When updating the operation mode so that the engine operation mode is switched to the engine non-operation mode, the hybrid ECU 12 may stop the engine 21, and turn on the main relay 31.

[Processes of Setting Thresholds]

Figure 3A:
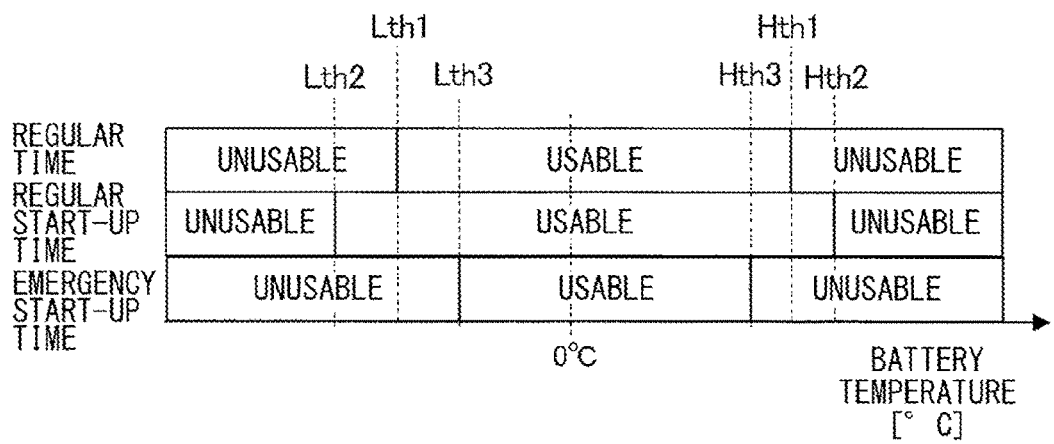
FIG. 3A is a diagram of an example of thresholds of a battery temperature that is included in second information indicating states of the main battery.
Figure 3B:
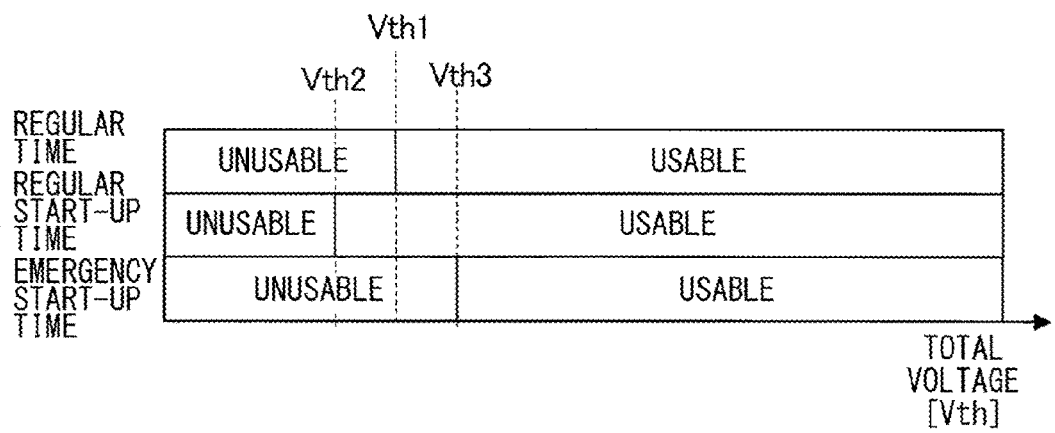
FIG. 3B is a diagram of an example of thresholds of a total voltage that is included in the second information indicating the states of the main battery.
Figure 3C:
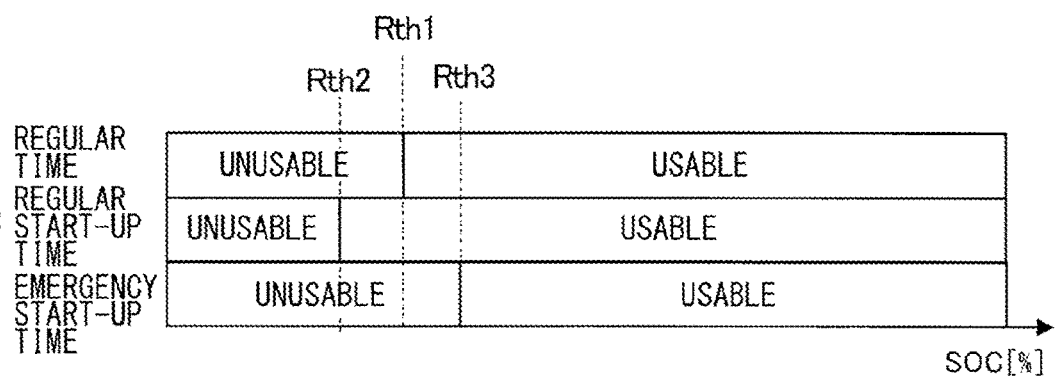
FIG. 3C is a diagram of an example of thresholds of a SOC that is contained in the second information indicating the states of the main battery.

A description is given of processes of setting the thresholds used for the first determination d1 to the third determination d3. FIGS. 3A, 3B, and 3C illustrate examples of the thresholds for the second information that indicates states of the main battery. FIG. 3A illustrates an example of the thresholds of the battery temperature $T_B$. FIG. 3B illustrates an example of the thresholds of the total voltage $V_B$. FIG. 3C illustrates an example of the thresholds of the SOC $R_B$.

The determinations based on the information elements, including the battery temperature $T_B$, the total voltage $V_B$, and the SOC $R_B$, that are included in the second information may be less precise than that based on the information element, e.g., the "dischargeable power $Wout_B$", of the first information. For this reason, the determination results based on the information elements included in the second information may possibly be overturned by the decisive determination result based on the first information. In addition, the determination results based on the information elements included in the second information may possibly differ from one another. As illustrated in FIGS. 3A to 3C, therefore, the lower threshold Lth, the upper threshold Hth, and the thresholds Vth and Rth to be compared with the corresponding information elements, including the battery temperature $T_B$, the total voltage $V_B$, and the SOC $R_B$, of the second information may be set in a variable manner depending on a situation.

At a regular start-up time of the electric vehicle, the lower threshold Lth and the upper threshold Hth of the battery temperature $T_B$ included in the second information may be set as in the second row of FIG. 3A. Likewise, the threshold Vth of the total voltage $V_B$ included in the second information may be set as in the second row of FIG. 3B. The threshold Rth of the SOC $R_B$ included in the second information may be set as in the second row of FIG. 3C. In an example implementation, the lower threshold Lth, the upper threshold Hth, and the thresholds Vth and Rth may be set to the lower threshold Lth2, the upper threshold Hth2, and the thresholds Vth2 and Rth2, respectively, that cause the hybrid ECU 12 to be more likely to determine that the electric power of the main battery 15 is usable than the lower threshold Lth1, the upper threshold Hth1, and the thresholds Vth1 and Rth1 at a regular time. In this example implementation, each of the lower threshold Lth1, the upper threshold Hth1, and the thresholds Vth1 and Rth1 used at the regular time may be respective thresholds that are set in consideration of various actual states that would occur in the main battery 15 so that the determination based on the second information becomes, on average, about as precise as that based on the first information. In other words, each of the lower threshold Lth1, the upper threshold Hth1, and the thresholds Vth1 and Rth1 used at the regular time may be regarded as a threshold that is used when making the determination as to whether the electric power of the main battery 15 is usable on the basis of the second information upon regular running of the electric vehicle.

As described with reference to FIG. 2, once the engine operation mode is selected in the first determination d1 to the third determination d3, the hybrid ECU 12 is not permitted to update the operation mode so that the engine operation mode is switched to the engine non-operation mode, regardless of a result of the determination made thereafter. For example, when the lower threshold Lth1, the upper threshold Hth1, and the thresholds Vth1 and Rth1 are employed as thresholds of the information elements included in the second information, the hybrid ECU 12 may be more likely to select the engine operation mode in each of the first determination d1 to the third determination d3 than the engine non-operation mode. When the lower threshold Lth2, the upper threshold Hth2, and the thresholds Vth2 and Rth2 are employed as thresholds of the information elements included in the second information as in the second rows of FIGS. 3A to 3C, the hybrid ECU 12 may be more likely to select the engine non-operation mode than the engine operation mode, on the basis of the second information. This makes it possible to suppress the engine operation mode from being selected excessively on the basis of the second information.

At an emergency start-up time of the electric vehicle, the lower threshold Lth and the upper threshold Hth for the battery temperature $T_B$ included in the second information may be set as in the third row of FIG. 3A. Likewise, the threshold Vth for the total voltage $V_B$ included in the second information may be set as in the third row of FIG. 3B. The threshold Rth for the SOC $R_B$ included in the second information may be set as in the third row of FIG. 3C. In an example implementation, the lower threshold Lth, the upper threshold Hth, and the thresholds Vth and Rth may be set to the thresholds Lth3, Hth3, Vth3, and Rth3, respectively, that cause the hybrid ECU 12 to be more likely to determine that the electric power of the main battery 15 is unusable than the lower threshold Lth2, the upper threshold Hth2, and the thresholds Vth2 and Rth2 at the regular start-up time. In one implementation, the term "emergency start-up time" may refer to the time at which the sub-battery 17 is determined as being deteriorated to the extent that its property drops below a preset threshold, or the time at which the start-up process is performed after the sub-battery 17 has been shut down upon the most-previous start-up of the electric vehicle. A non-limiting example of the deterioration of the sub-battery 17 may be an increase in the internal resistance of the sub-battery 17. The sub-battery 17 may be monitored by an unillustrated monitoring unit that detects the deterioration of the sub-battery 17.

At the emergency start-up time, there are possible cases where the remaining amount of electric power charged in the sub-battery 17 is minimal to start the engine 21. In such a case, if the electric power of the main battery 15 is unusable, the electric vehicle may be unable to run. Setting the thresholds as in the third rows of FIGS. 3A to 3C may cause the hybrid ECU 12 to be more likely to select the engine operation mode when there is some probability that the electric power of the main battery 15 is unusable. As a result, the engine ECU 13 may start the engine 21 promptly, making it possible to reduce the possibility that the electric vehicle becomes unable to run.

[Detailed Procedure for Start-Up Process]

Figure 4:
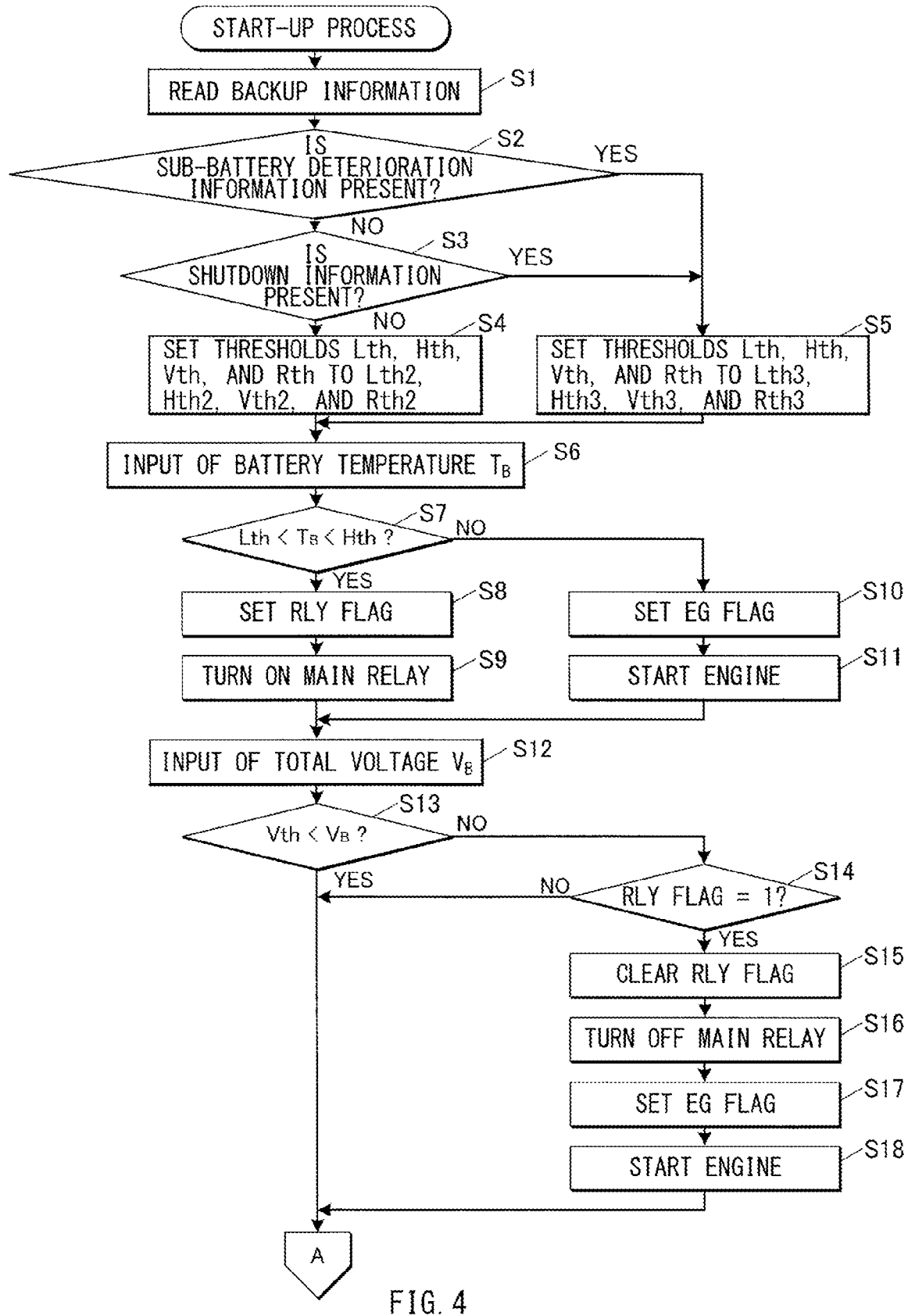
FIG. 4 is a flowchart of an example of a first part of a start-up process performed by a hybrid ECU.
Figure 5:
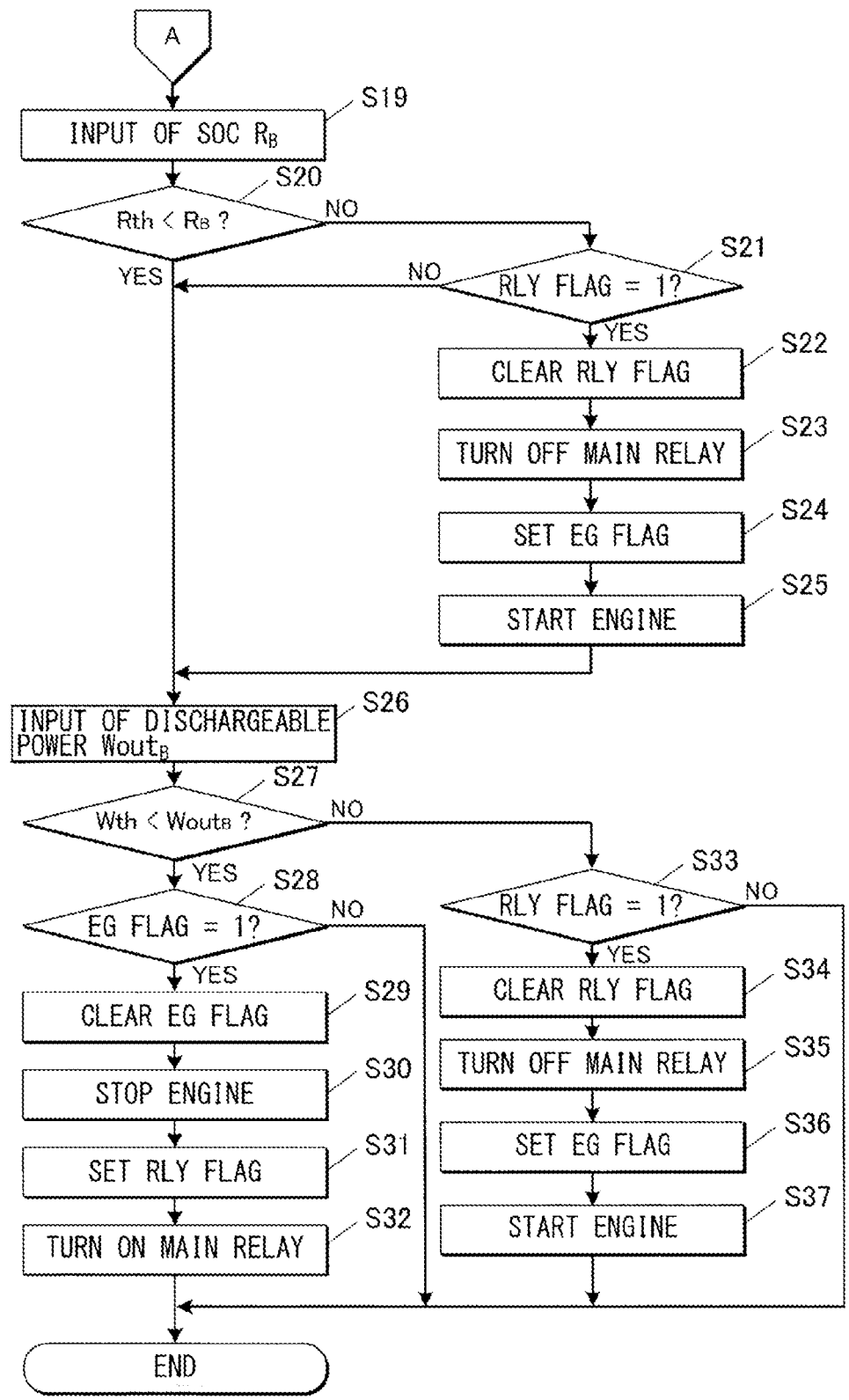
FIG. 5 is a flowchart of an example of a second part of the start-up process performed by the hybrid ECU.

The above example processes of setting the thresholds and making the first determination d1 to the fourth determination d4 may be achieved by the start-up process illustrated in FIGS. 4 and 5. FIGS. 4 and 5 are flowcharts of an example of a detailed procedure for the start-up process performed by the hybrid ECU 12.

When receiving a start-up signal generated in response to an operation of the unillustrated ignition switch or an unillustrated start button, the hybrid ECU 12 may initiate the start-up process. When the start-up process is initiated, at step S1, the hybrid ECU 12 may read, from the backup memory 12a, information regarding the deterioration of the sub-battery 17 and information regarding the shutdown of the sub-battery 17 which has occurred upon the start-up process.

When the deterioration of the sub-battery 17 is detected during the operation of the system in the electric vehicle, the information regarding this deterioration may be stored in the backup memory 12a in the nonvolatile manner. In an example implementation, the deterioration of the sub-battery 17 may be an increase in the internal resistance of the sub-battery 17. In an example implementation, the unillustrated monitoring unit may detect the deterioration of the sub-battery 17 and transmit the information regarding this deterioration to the hybrid ECU 12. When the start-up process is interrupted due to the shutdown of the sub-battery 17 or when the start-up process that has been interrupted due to the shutdown of the sub-battery 17 resumes, the hybrid ECU 12 may store information regarding this shutdown in the backup memory 12a so that the hybrid ECU 12 is able to recognize that the shutdown has occurred. In an example implementation, this shutdown information may contain a start time and end time of the start-up process. The hybrid ECU 12 may write the start time in the backup memory 12a upon the start of the start-up process and may write the end time in the backup memory 12a upon the end of the start-up process. If the power shutdown information contains a start time of the start-up process which is close to a present time but no end time corresponding to the start time, the hybrid ECU 12 may recognize that the power shutdown has occurred.

After performing the reading of the deterioration information of the sub-battery 17 and the shutdown information from the backup memory 12a, the hybrid ECU 12 may determine the presence of the deterioration information of the sub-battery 17 at step S2, and may determine the presence of the shutdown information at step S3. At step S4 or S5, the hybrid ECU 12 may perform a process of setting the lower threshold Lth, the upper threshold Hth, and the thresholds Vth and Rth in accordance with the above determination results. The method of setting the lower threshold Lth, the upper threshold Hth, and the thresholds Vth and Rth may be performed on the basis of one example described above.

At step S6, the hybrid ECU 12 may receive, as the battery temperature $T_B$ reflecting the actual state, the battery temperature $T_B$ different from its initial value from the battery ECU 11. For example, when receiving the battery temperature $T_B$ different from its initial value from the battery ECU 11, the hybrid ECU 12 may regard this battery temperature $T_B$ as the battery temperature $T_B$ reflecting the actual state. At step S7, the hybrid ECU 12 may determine whether the electric power of the main battery 15 is usable on the basis of the received battery temperature $T_B$. At step S9 or S11, the hybrid ECU 12 may perform a process of selecting the operation mode of the engine 21 in accordance with a result of the determination made at step S7. At step S8 or S10, the hybrid ECU 12 may set a RLY flag or an EG flag in conjunction with the selection of the operation mode so that the hybrid ECU 12 is able to check which operation mode has been selected afterward. In an example implementation, the "RLY flag is set" or "RLY flag=1" may represent the turn-on of the main relay 31 or the selection of the engine non-operation mode. In an example implementation, the "EG flag is set" or "EG flag=1" may represent the operation of the engine 21 or the engine operation mode. The processing at steps S6 to S11 may correspond to the process of the first determination d1 in FIG. 2.

At step S12, the hybrid ECU 12 may receive, as the total voltage $V_B$ reflecting the actual state, the total voltage $V_B$ different from its initial value from the battery ECU 11. For example, when receiving the total voltage $V_B$ different from its initial value from the battery ECU 11, the hybrid ECU 12 may regard this total voltage $V_B$ as the total voltage $V_B$ reflecting the actual state. At step S13, the hybrid ECU 12 may determine whether the electric power of the main battery 15 is usable on the basis of the received total voltage $V_B$. At steps S14, S16, and S18, the hybrid ECU 12 may perform a process of updating the operation mode of the engine 21 in accordance with a result of the determination made at step S13. In the update process, at step S14, the hybrid ECU 12 may identify which operation mode has been selected most previously, on the basis of the value of the RLY flag. In this case, the hybrid ECU 12 may perform the update process only when the engine non-operation mode is to be switched to the engine operation mode. In the update process, at steps S15 and S17, the hybrid ECU 12 may update the RLY flag and the EG flag so that the hybrid ECU 12 is able to check which operation mode has been selected afterward. The processing at step S12 to S18 may correspond to the process of the second determination d2 in FIG. 2.

At step S19, the hybrid ECU 12 may receive, as the SOC $R_B$ reflecting the actual state, the total SOC $R_B$ different from its initial value from the battery ECU 11. For example, when receiving the total SOC $R_B$ different from its initial value from the battery ECU 11, the hybrid ECU 12 may regard this total voltage $V_B$ as the SOC $R_B$ reflecting the actual state. At step S20, the hybrid ECU 12 may determine whether the electric power of the main battery 15 is usable on the basis of the received SOC $R_B$. At steps S21, S23, and S25, the hybrid ECU 12 may perform a process of updating the operation mode of the engine 21 in accordance with a result of the determination made at step S20. In the update process, at step S21, the hybrid ECU 12 may identify which operation mode has been selected most previously, on the basis of the value of the RLY flag. In this case, the hybrid ECU 12 may perform the update process only when the engine non-operation mode is to be switched to the engine operation mode. In the update process, at steps S22 and S24, the hybrid ECU 12 may update the RLY flag and the EG flag so that the hybrid ECU 12 is able to check which operation mode has been selected afterward. The processing at step S19 to S25 may correspond to the process of the third determination d3 in FIG. 2.

At step S26, the hybrid ECU 12 may receive, as the dischargeable power $Wout_B$ reflecting the actual state, the dischargeable power $Wout_B$ different from its initial value from the battery ECU 11. For example, when receiving the dischargeable power $Wout_B$ different from its initial value from the battery ECU 11, the hybrid ECU 12 may regard this dischargeable power $Wout_B$ as the dischargeable power $Wout_B$ reflecting the actual state. At step S27, the hybrid ECU 12 may decisively determine whether the electric power of the main battery 15 is usable on the basis of the received dischargeable power $Wout_B$. At step S28 or S33, the hybrid ECU 12 may determine whether an operation mode of the engine 21 related to the result of the decisive determination is identical to the operation mode that has been selected most previously. When the determination result indicates that it is necessary to switch the operation mode, at steps S30 and S32 or steps S35 and S37, the hybrid ECU 12 may perform the update process in which the present operation mode is switched to the other. In the update process, at steps S29 and S31 or steps S34 and S36, the hybrid ECU 12 may update the RLY flag and the EG flag so that the hybrid ECU 12 is able to check which operation mode has been selected afterward. The processing at steps S26 to S37 may correspond to the process of the fourth determination d4 in FIG. 2.

The example start-up process that has been described with reference to FIGS. 4 and 5 achieves the foregoing processes of setting the thresholds and making the first determination d1 to the fourth determination d4. In one implementation, steps S6, S7, S12, and S13 in FIG. 4, steps S19, S20, S26, and S27 in FIG. 5, and the hybrid ECU 12 that performs these steps may serve as the "determiner". In one implementation, steps S8 to S11, S14 to S18, S21 to S25, and S28 to S37 and the hybrid ECU 12 that performs these steps may serve as the "switching controller". In one implementation, steps S1 to S5 and the hybrid ECU 12 that performs these steps may serve as the "threshold setting unit".

Incidentally, upon start-up as well as during running of an electric vehicle, it is preferable that an operation mode be selected between an engine operation mode and an engine non-operation mode, in accordance with a state of a main battery. Under such a control, when electric power of the main battery is usable, the engine non-operation mode is selected, thereby making it possible to suppress an engine from being driven unnecessarily. Further, when the electric power of the main battery is unusable, for example, due to a decrease in a remaining amount of charged electric power, the engine is started to allow for running of the electric vehicle and charging of the main battery.

Further, upon the start-up of the electric vehicle, it is preferable that the operation mode be selected between the engine operation mode and the engine non-operation mode with a slight delay time from the start up. One reason for this is that the engine runs on electric power of a sub-battery disposed independently of the main battery, and the electric power of the sub-battery is supplied to many electrical parts after the start-up of the electric vehicle. There are cases where, when the electric vehicle starts up, the electric power of the main battery is unusable and the remaining amount of electric power charged in the sub-battery is minimal to start the engine. In such a case, if there is a long delay time until an operation mode of the engine is selected, the electric power of the sub-battery may possibly further decrease within this delay time, and eventually the electric power possibly becomes too low to start the engine. As a result, the electric vehicle may possibly become unable to run. Such a situation in which the electric vehicle becomes unable to run is disadvantageous for a passenger in the electric vehicle. Therefore, it is desirable that such a situation be prevented from occurring.

However, simply making a timing of selecting the operation mode of the engine earlier to shorten the delay time required to select the operation mode upon the start-up of the electric vehicle may possibly raise the following example issues. Namely, whether the electric power of the main battery is usable or not is determinable, for example, from a value of dischargeable power of the main battery. Unfortunately, it possibly involves spending a considerable time to calculate the value of the dischargeable power after the start-up of the electric vehicle. Thus, if the timing of selecting the operation mode of the engine is made earlier without any measure, a control apparatus of the electric vehicle may possibly fail to acquire precise information on the dischargeable power until the timing at which the selection is made. For example, a monitor unit of the main battery may sometimes be designed to transmit values of the dischargeable power at regular intervals after the start-up of the electric vehicle. The monitor unit of the main battery may sometimes be designed to transmit an initial value of a variable that is to be held as information on the dischargeable power, before the initial dischargeable power is calculated. In this case, the control apparatus in the electric vehicle receives any preset initial value instead of information on the precise dischargeable power that reflects the actual state, until the dischargeable power has been calculated.

Thus, simply making the timing of selecting the operation mode of the engine earlier raises an issue in which the operation mode of the engine is selected on the basis of the preset initial value of the dischargeable power. In this case, the engine operation mode may possibly be selected constantly depending on the setting of the preset initial value, even when the electric power of the main battery is usable. This may in turn raise an issue in which the engine is started unnecessarily, thus leading to a decrease in fuel mileage. Moreover, immediately after the engine is started, the engine operation mode may possibly be switched to the engine non-operation mode. This may possibly cause a main relay to be turned on/off many times to open or close the output of the main battery, leading to early deterioration of the main relay.

As opposed to the above, in the electric vehicle mounted with the control apparatus according to one implementation, the monitor determiner (the battery ECU 11 and the hybrid ECU 12) determines, upon the start-up of the electric vehicle, whether the electric power of the main battery 15 is usable on the basis of the second information, before the first information is calculated. Hence, it is possible to obtain a result of the determination as to whether the electric power of the main battery 15 is usable more swiftly than a configuration that does not make the determination until the first information is calculated. In addition, the monitor determiner swiftly determines whether the electric power of the main battery 15 is usable on the basis of the second information that serves as the determination factor used for the determination. Hence, it is possible to obtain a result of the determination more appropriately than a case that simply makes the timing of making the determination earlier without using any information. Furthermore, after having made the determination based on the second information, the monitor determiner determines whether the electric power of the main battery 15 is usable on the basis of the first information that allows for the decision on whether the electric power of the main battery 15 is usable. Hence, it is possible to obtain a result a precise result of the determination eventually. In this way, the control apparatus of the electric vehicle according to one implementation is able to swiftly and appropriately determine whether the electric power of the main battery 15 is usable upon the start-up of the electric vehicle. Thus, for example, it is possible to suppress the unnecessary starting of the engine and suppress the frequent turning on/off of the main relay 31, while reducing the probability that the electric vehicle becomes unable to run upon the start-up of the electric vehicle in a situation where the remaining amount of electric power charged in the sub-battery 17 is decreased.

According to an example implementation, upon the start-up of the electric vehicle, the hybrid ECU 12 determines whether the electric power of the main battery 15 is usable on the basis of the second information, before calculating the first information that allows for the decision on whether the electric power of the main battery 15 is usable. Hence, it is possible to obtain a result of the determination as to whether the electric power of the main battery 15 is usable more swiftly than a configuration that does not make the determination until the first information is calculated.

For example, suppose that the electric power of the main battery 15 becomes unusable and the remaining amount of electric power charged in the sub-battery 17 becomes minimal to start the engine 21. In such an example case, if the selection of the operation mode of the engine 21 is delayed upon the start-up of the electric vehicle, the electric power of the sub-battery 17 may possibly be consumed by a plurality of ECUs and other devices with this delay time, leading to a further decrease in the remaining amount of electric power charged in the sub-battery 17. As a result, the engine 21 may possibly become unable to start, increasing the possibility that the electric vehicle becomes unable to run. However, the hybrid ECU 12 according to the foregoing example implementation is able to swiftly determine whether the electric power of the main battery 15 is usable as described above. This makes it possible to reduce the probability that the electric vehicle becomes unable to run even if the remaining amount of electric power charged in the sub-battery 17 is small.

Further, if the timing of determining whether the electric power of the main battery 15 is simply made earlier, it is difficult to obtain an appropriate determination result. For example, the engine operation mode may possibly be selected constantly whenever the electric vehicle starts up. As a result, even when the electric power of the main battery 15 is usable, the engine 21 may possibly be caused to start unnecessarily, leading to the decrease in the fuel mileage. Furthermore, immediately after the starting of the engine 21, the operation mode may possibly be switched to the engine non-operation mode. As a result, the main relay 31 may possibly be turned on/off frequently, leading to acceleration in the deterioration of the main relay 31.

In contrast, the hybrid ECU 12 according to an example implementation swiftly determines whether the electric power of the main battery 15 is usable on the basis of the second information as the determination factor. Thus, it is possible to obtain a result of the determination more appropriately than a case that simply makes the timing of making the determination earlier. Hence, it is possible to suppress an issue in which the engine 21 is caused to start unnecessarily upon the start-up of the electric vehicle and thus the fuel mileage of the electric vehicle decreases, as well as an issue in which turning on/off of the main relay 31 occurs frequently and thus the deterioration of the main relay 31 is accelerated. Furthermore, the hybrid ECU 12 makes the determination based on the first information after having made the determination based on the second information. Hence, it is possible to confirm whether the operation mode of the engine 21 has been selected appropriately, on the basis of the precise result of the determination obtained eventually.

Further, in an example implementation, after having selected the engine operation mode as a result of the determination that is based on one of the information elements included in the second information, the hybrid ECU 12 may refrain from updating the operation mode to the engine non-operation mode, regardless of the determination results that are based on other information elements included in the second information which are to be received later. Hence, it is possible to suppress the operation mode of the engine 21 from being switched frequently within a short time between the engine non-operation mode and the engine operation mode, due to the determination results that are based on the plurality of information elements included in the second information.

Further, in an example implementation, the hybrid ECU 12 may set, at the regular start-up time, the thresholds of the second information to values that cause the electric power of the main battery 15 to be more likely to be determined to be usable than those at the regular time. Hence, it is possible to suppress the engine 21 from being started excessively upon the start-up of the electric vehicle.

Moreover, in an example implementation, the hybrid ECU 12 may vary the setting of thresholds of the second information in accordance with a state of the deterioration of the sub-battery 17. The setting of the thresholds of the second information may also be varied when the shutdown occurs in the sub-battery 17 upon the most-previous start-up. Hence, it is possible to select the engine operation mode swiftly when the remaining amount of electric power charged in the sub-battery 17 is expected to be small, and thereby to reduce the probability that the electric vehicle becomes unable to run.

[Modification]

Figure 6:
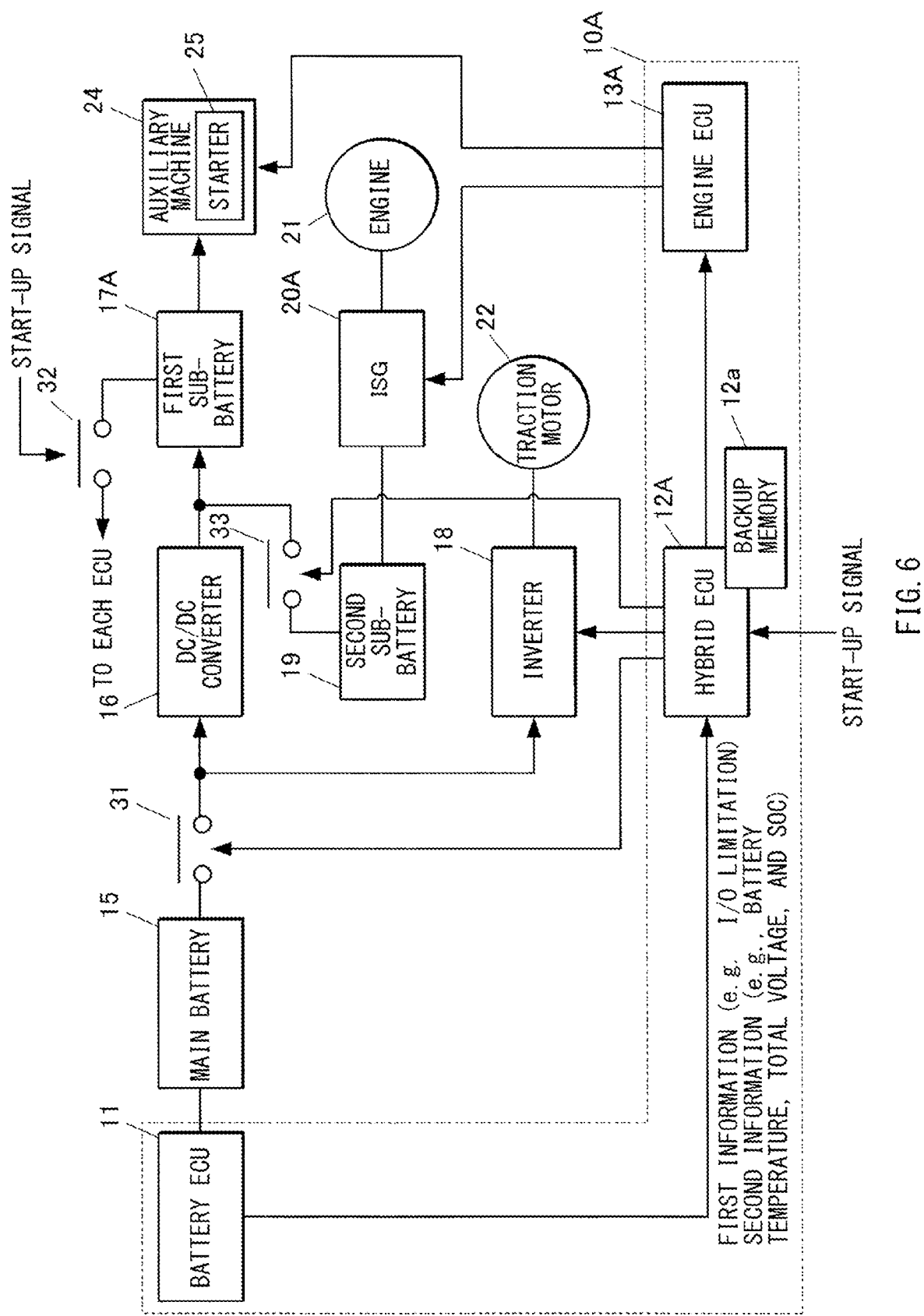
FIG. 6 is a control block diagram of an example of an electric vehicle equipped with a control apparatus according to a modification of one implementation of the technology.

FIG. 6 is a control block diagram of an example of an electric vehicle equipped with a control apparatus according to a modification of one implementation of the technology.

A control apparatus 10A according to this modification may include a first sub-battery 17A and a second sub-battery 19 that supply electric power to electrical parts other than the traction motor 22. In addition, the control apparatus 10A may further include an integrated starter generator (ISG) 20A instead of the electric generator 20. The other components in the control apparatus 10A according to this modification are similar to those in the control apparatus 10 according to one implementation illustrated in FIG. 1 and thus given the same reference numerals, and such components are not described in detail.

An electric vehicle according to this modification may include the battery ECU 11, a hybrid ECU 12A, and an engine ECU 13A in the control apparatus 10A. In addition, the electric vehicle according to this modification may include the first sub-battery 17A, the second sub-battery 19, the ISG 20A, and a relay 33. In one implementation, the battery ECU 11 and the hybrid ECU 12A illustrated in FIG. 6 may serve as the "monitor determiner". In one implementation, the battery ECU 11 may serve as the "battery monitoring unit". In one implementation, the hybrid ECU 12 may serve as the "determiner", the "switching controller", and the "threshold setting unit". In one implementation, the first sub-battery 17A and the second sub-battery 19 may serve as the "sub-battery". In one implementation, the ISG 20A may serve as the "electric generator".

Each of the first sub-battery 17A and the second sub-battery 19 may be a secondary battery such as the lead-acid battery. The first sub-battery 17A and the second sub-battery 19 each may output a voltage, such as 12 V, that is lower than that of the main battery 15. The first sub-battery 17A may supply the electric power to a plurality of ECUs and the auxiliary machine 24. The first sub-battery 17A may also be referred to as the "auxiliary machine battery". The second sub-battery 19 may supply the electric power that is used solely to restart the engine 21 after the idling stop. The second sub-battery 19 may also be referred to as the "dedicated restart battery".

The ISG 20A may function as both a motor that generates power directed to restarting of the driving of the engine 21 and a power generator that generates electric power by means of the power of the engine 21. The ISG 20A may supply the electric power to the second sub-battery 19 and the first sub-battery 17A.

The engine ECU 13A may have a function of controlling the ISG 20A in addition to the function of the engine ECU 13 illustrated in FIG. 1. While the engine 21 is being driven, the engine ECU 13A may cause the ISG 20A to generate the electric power to charge the second sub-battery 19. When the electric vehicle has stopped running, the engine ECU 13A may stop the driving of the engine 21 for the idling stop. Upon start-up of the electric vehicle following the idling stop, the engine ECU 13A may cause the ISG 20A to generate the power by means of the electric power of the second sub-battery 19, thereby restarting the engine 21.

The hybrid ECU 12A may have a function of turning on/off the relay 33 in addition to the function of the hybrid ECU 12 illustrated in FIG. 1. When switching the operation mode of the engine 21 to the engine operation mode, the hybrid ECU 12A may turn on or "close" the relay 33. Thus, the electric power that the ISG 20A has generated by means of the power of the engine 21 may be supplied to the second sub-battery 19 and the first sub-battery 17A, making it possible to charge both the second sub-battery 19 and the first sub-battery 17A. When switching the operation mode of the engine 21 to the engine non-operation mode, the hybrid ECU 12A may turn off or "open" the relay 33. Thus, it is possible to charge the first sub-battery 17A with the electric power of the main battery 15 without allowing the electric power of the main battery 15 to be supplied to the second sub-battery 19.

The hybrid ECU 12A according to the foregoing one modification is able to appropriately determine whether the electric power of the main battery 15 is usable with a slight delay time upon the start-up of the electric vehicle, owing to workings that are similar to those according to one implementation described in FIG. 1. Thus, it is possible to reduce the possibility that the electric power of the main battery 15 becomes unusable upon the start-up of the electric vehicle when both the first sub-battery 17A and the second sub-battery 19 are small in remaining amount of charged electric power. Hence, it is possible to reduce the possibility that the electric vehicle becomes unable to run due to such circumstances. Furthermore, it is possible to suppress the engine 21 from being started unnecessarily upon the start-up of the electric vehicle, and suppress the acceleration in the deterioration of the main relay 31 and the relay 33 due to the frequent turning on/off of the main relay 31 and the relay 33. Moreover, it is also possible for the electric vehicle and the hybrid ECU 12A according to the foregoing example modification to achieve other workings and other effects that are achieved by one implementation illustrated in FIG. 1.

Some implementations and modifications of the technology have been described above. However, the technology is not limited to those implementations and modifications.

For example, the foregoing implementation, the dischargeable power is employed as the first information that allows for the decision on whether the electric power of the main battery 15 is usable. However, any other information may be employed as the first information to decide whether the electric power of the main battery 15 is usable. Non-limiting examples of such information may include a dischargeable current limit and an internal resistance of the main battery 15. In an alternative example implementation, the first information may include the information on the dielectric resistance of the main battery 15 and/or the malfunction-related information such as the leakage state of the main battery 15.

For example, in the foregoing implementation, the battery temperature, the total voltage, and the SOC are employed as the second information that serves as the determination factor that is directed to determining whether the electric power of the main battery 15 is usable; however, the second information is not limited to those parameters. In addition, the second information does not necessarily have to include the plurality of information elements such as the battery temperature, the total voltage, or the SOC. Alternatively, the second information may include a single information element.

In the foregoing implementation, the main battery 15 is not limited to the lithium-ion battery. In an alternative implementation, the main battery 15 may be any rechargeable battery such as a nickel-hydrogen battery.

For example, according to the foregoing implementation, the hybrid ECU 12 may determine whether the electric power of the main battery 15 is usable on the basis of the second information upon the start-up of the electric vehicle, before the battery ECU 11 completes the calculation of the first information. In an alternative example implementation, the battery ECU 11 may calculate provisional first information on the basis of the second information upon the start-up of the electric vehicle, before calculating the first information. The provisional first information may be the first information that is provisional. After calculating the provisional first information, the battery ECU 11 may transmit, as the first information, the provisional first information to the hybrid ECU 12. Thereafter, the hybrid ECU 12 may compare the provisional first information with a preset threshold to determine whether the electric power of the main battery 15 is usable. For example, before the calculation of the first information (e.g., the dischargeable power $Wout_B$) is completed, the battery ECU 11 may set the provisional first information to, e.g., "20 kW", which is close to a normal value of the first information, on a condition that the battery temperature $T_B$ is normal. Thereafter, the battery ECU 11 may transmit the calculated provisional first information to the hybrid ECU 12 as the first information, instead of transmitting an initial value of, e.g., "0 kW" to the hybrid ECU 12 as the first information. Thereafter, if the total voltage $V_B$ is normal, the battery ECU 11 may set the provisional first information to, e.g., "30 kW", which is close to a normal value of the first information, and may transmit this provisional first information to the hybrid ECU 12 as the first information. In this way, as the plurality of information elements of the second information, each serving as the determination factor directed to determining whether the electric power of the main battery 15 is usable, become fixed, the battery ECU 11 may so calculate the provisional first information as to approximate normal values of the first information. Such a configuration also enables both the battery ECU 11 and the hybrid ECU 12 to cooperate together to determine whether the electric power of the main battery 15 is usable on the basis of the second information, before the first information is calculated. Hence, upon the start-up of the electric vehicle, it is possible to appropriately determine whether the electric power of the main battery 15 is usable with a slight delay time. Moreover, such a configuration is able to eliminate the necessity of making the determination based on the second information, which helps to reduce a processing load on the hybrid ECU 12. In an example implementation, "the normal value of the first information" described above may be any specific value of the first information, where the main battery 15 is in a normal state. Non-limiting examples of such a specific value may include a rated value and maximum value which are calculated from the performance of the main battery 15. In an alternative example implementation, "the normal value of the first information" may be a value of the first information which has been calculated at a certain time point during a previous system operation of the electric vehicle. In a further alternative example implementation, "the normal value of the first information" may be an estimated value of the first information at a present time point under the precondition that the main battery 15 is in a normal state. This estimated value may be based on: a value of the first information which has been calculated at a certain time point during the previous system operation of the electric vehicle; and elapsed-time information on the main battery 15 which has been acquired after the certain time point. In an example implementation, "the elapsed-time information on the main battery 15" may be various pieces of information, including information on a time elapsed from the above certain time point, information on the charge-discharge electric power of the main battery 15 at the certain time point, and other information related to a value of the first information. Non-limiting example of "the certain time point" described above may include: the previous time point when the electric vehicle started up; any time point during the previous system operation of the electric vehicle; and a time point immediately before the previous system ending of the electric vehicle.

In the foregoing implementation, the description has been given with reference to the electric vehicle that runs on the power of the engine being driven. In such an implementation, the engine operation mode may refer to an engine operation mode in which the electric vehicle runs on the power of the engine, and the engine non-operation mode may refer to a motor operation mode in which the electric vehicle runs on the power of the traction motor. However, the control apparatus according to any implementation may be mounted in a series-type hybrid electric vehicle. In such an alternative implementation, the engine operation mode refers to an operation mode in which the vehicle runs on the power of the traction motor while generating electric power by means of the power of the engine, and the engine non-operation mode may refer to an operation mode in which the vehicle runs on the power of the traction motor without operating the engine. Moreover, in one implementation, the control apparatus of the electric vehicle may use a result of the determination on whether the electric power of the main battery is usable, made upon the start-up of the electric vehicle, for a control other than a control that performs switching of modes. Other details of the foregoing implementation and modification may be modified as appropriate without departure from the scope of the technology.

The battery ECU 11 and the hybrid ECU 12 illustrated in FIGS. 1 and 6 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the battery ECU 11 and the hybrid ECU 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the battery ECU 11 and the hybrid ECU 12 illustrated in FIGS. 1 and 6.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus of an electric vehicle, the control apparatus comprising:
 a monitor determiner configured to monitor a state of a main battery that supplies electric power directed to running, and determine whether the electric power of the main battery is usable on a basis of first information and second information, the first information being a deciding factor that is directed to deciding whether the electric power of the main battery is usable, the second information being a determination factor that is directed to determining whether the electric power of the main battery is usable,
 the monitor determiner being configured to determine, upon start-up of the electric vehicle, whether the electric power of the main battery is usable on the basis of the second information before the first information is calculated, and decide whether the electric power of the main battery is usable on the basis of the first information when the first information is calculated.

2. The control apparatus of the electric vehicle according to claim 1, further comprising a switching controller,
the electric vehicle includes:
the main battery;
an engine;
a traction motor to be driven by the electric power of the main battery;
a sub-battery configured to supply electric power to an electrical part other than the traction motor;
an electric generator configured to generate, with power of the engine, electric power to charge the sub-battery;
a main relay closable to make a current path between the main battery and the traction motor and openable to block the current path; and
a DC/DC converter configured to, when the main relay is closed, convert the electric power of the main battery to charge the sub-battery,
the switching controller is configured to switch an operation mode between an engine operation mode and an engine non-operation mode, the engine operation mode causing the engine to be driven, the engine non-operation mode allowing the electric vehicle to run by the traction motor without driving the engine, and
the switching controller is configured to select the engine non-operation mode to close the main relay when the monitor determiner determines, upon the start-up of the electric vehicle, that the electric power of the main battery is usable, and selects the engine operation mode to start the engine when the monitor determiner determines, upon the start-up of the electric vehicle, that the electric power of the main battery is unusable.

3. The control apparatus of the electric vehicle according to claim 2, wherein the second information includes a first information element and a second information element, and
the switching controller selects, upon the start-up of the electric vehicle, the engine operation mode on a basis of a result of determination that is based on the first information element, and refrains from switching the operation mode on a basis of a result of determination that is based on the second information element after selecting the engine operation mode upon the start-up of the electric vehicle.

4. The control apparatus of the electric vehicle according to claim 3, wherein the monitor determiner compares the second information with a preset threshold to determine whether the electric power of the main battery is usable, and
the preset threshold has a value that causes the monitor determiner to be more likely to determine that the electric power of the main battery is usable when the monitor determiner determines whether the electric power of the main battery is usable on the basis of the second information, than when the monitor determiner determines whether the electric power of the main battery is usable on the basis of the first information.

5. The control apparatus of the electric vehicle according to claim 4, wherein the monitor determiner compares the second information with a preset threshold to determine whether the electric power of the main battery is usable, and
the monitor determiner includes a threshold setting unit that varies the preset threshold in accordance with a state of deterioration of the sub-battery.

6. The control apparatus of the electric vehicle according to claim 4, wherein the monitor determiner compares the second information with a preset threshold to determine whether the electric power of the main battery is usable, and
the monitor determiner includes:
a backup memory that stores information on an occurrence of shutdown of the sub-battery when the sub-battery is shut down upon the start-up of the electric vehicle; and
a threshold setting unit that varies, when the information on the occurrence of the shutdown is stored in the backup memory, the preset threshold used upon the start-up of the electric vehicle to a value, the value causing the monitor determiner to be more likely to determine that the electric power of the main battery is unusable than when the information on the occurrence of the shutdown is not stored in the backup memory.

7. The control apparatus of the electric vehicle according to claim 4, wherein the monitor determiner includes:
a battery monitoring unit configured to calculate the first information, and acquires or calculates the second information; and
a determiner configured to determine whether the electric power of the main battery is usable,
the battery monitoring unit is configured to acquire or calculates the second information upon the start-up of the electric vehicle, and calculate the first information after acquiring or calculating the second information, and
the determiner is configured to determine, upon the start-up of the electric vehicle, whether the electric power of the main battery is usable on a basis of the second information before the first information is calculated by the battery monitoring unit, and decide whether the electric power of the main battery is usable on a basis of the first information when the first information is calculated by the battery monitoring unit.

8. The control apparatus of the electric vehicle according to claim 3, wherein the monitor determiner compares the second information with a preset threshold to determine whether the electric power of the main battery is usable, and
the monitor determiner includes a threshold setting unit that varies the preset threshold in accordance with a state of deterioration of the sub-battery.

9. The control apparatus of the electric vehicle according to claim 3, wherein the monitor determiner compares the second information with a preset threshold to determine whether the electric power of the main battery is usable, and
the monitor determiner includes:
a backup memory that stores information on an occurrence of shutdown of the sub-battery when the sub-battery is shut down upon the start-up of the electric vehicle; and
a threshold setting unit that varies, when the information on the occurrence of the shutdown is stored in the backup memory, the preset threshold used upon the start-up of the electric vehicle to a value, the value causing the monitor determiner to be more likely to determine that the electric power of the main battery is unusable than when the information on the occurrence of the shutdown is not stored in the backup memory.

10. The control apparatus of the electric vehicle according to claim 3, wherein the monitor determiner includes:

a battery monitoring unit configured to calculate the first information, and acquires or calculates the second information; and a determiner configured to determine whether the electric power of the main battery is usable, the battery monitoring unit is configured to acquire or calculates the second information upon the start-up of the electric vehicle, and calculate the first information after acquiring or calculating the second information, and the determiner is configured to determine, upon the start-up of the electric vehicle, whether the electric power of the main battery is usable on a basis of the second information before the first information is calculated by the battery monitoring unit, and decide whether the electric power of the main battery is usable on a basis of the first information when the first information is calculated by the battery monitoring unit.

11. The control apparatus of the electric vehicle according to claim 2, wherein the monitor determiner compares the second information with a preset threshold to determine whether the electric power of the main battery is usable, and the monitor determiner includes a threshold setting unit that varies the preset threshold in accordance with a state of deterioration of the sub-battery.

12. The control apparatus of the electric vehicle according to claim 11, wherein the monitor determiner compares the second information with a preset threshold to determine whether the electric power of the main battery is usable, and the monitor determiner includes:

a backup memory that stores information on an occurrence of shutdown of the sub-battery when the sub-battery is shut down upon the start-up of the electric vehicle; and a threshold setting unit that varies, when the information on the occurrence of the shutdown is stored in the backup memory, the preset threshold used upon the start-up of the electric vehicle to a value, the value causing the monitor determiner to be more likely to determine that the electric power of the main battery is unusable than when the information on the occurrence of the shutdown is not stored in the backup memory.

13. The control apparatus of the electric vehicle according to claim 11, wherein the monitor determiner includes:

a battery monitoring unit configured to calculate the first information, and acquires or calculates the second information; and a determiner configured to determine whether the electric power of the main battery is usable, the battery monitoring unit is configured to acquire or calculates the second information upon the start-up of the electric vehicle, and calculate the first information after acquiring or calculating the second information, and the determiner is configured to determine, upon the start-up of the electric vehicle, whether the electric power of the main battery is usable on a basis of the second information before the first information is calculated by the battery monitoring unit, and decide whether the electric power of the main battery is usable on a basis of the first information when the first information is calculated by the battery monitoring unit.

14. The control apparatus of the electric vehicle according to claim 2, wherein the monitor determiner compares the second information with a preset threshold to determine whether the electric power of the main battery is usable, and the monitor determiner includes:

a backup memory that stores information on an occurrence of shutdown of the sub-battery when the sub-battery is shut down upon the start-up of the electric vehicle; and a threshold setting unit that varies, when the information on the occurrence of the shutdown is stored in the backup memory, the preset threshold used upon the start-up of the electric vehicle to a value, the value causing the monitor determiner to be more likely to determine that the electric power of the main battery is unusable than when the information on the occurrence of the shutdown is not stored in the backup memory.

15. The control apparatus of the electric vehicle according to claim 2, wherein the monitor determiner includes:

a battery monitoring unit configured to calculate the first information, and acquires or calculates the second information; and a determiner configured to determine whether the electric power of the main battery is usable, the battery monitoring unit is configured to acquire or calculates the second information upon the start-up of the electric vehicle, and calculate the first information after acquiring or calculating the second information, and the determiner is configured to determine, upon the start-up of the electric vehicle, whether the electric power of the main battery is usable on a basis of the second information before the first information is calculated by the battery monitoring unit, and decide whether the electric power of the main battery is usable on a basis of the first information when the first information is calculated by the battery monitoring unit.

16. The control apparatus of the electric vehicle according to claim 2, wherein the monitor determiner includes:

a battery monitoring unit configured to calculate the first information, and acquires or calculates the second information; and a determiner configured to determine whether the electric power of the main battery is usable, the battery monitoring unit is configured to calculate, upon the start-up of the electric vehicle, provisional first information on a basis of the second information, and calculate the first information after calculating the provisional first information, the provisional first information being the first information that is provisional, the determiner is configured to determine, upon the start-up of the electric vehicle, whether the electric power of the main battery is usable on a basis of the provisional first information before the first information is calculated by the battery monitoring unit, and decide whether the electric power of the main battery is usable on a basis of the first information when the first information is calculated by the battery monitoring unit.

17. The control apparatus of the electric vehicle according to claim 1, wherein the monitor determiner includes:

a battery monitoring unit configured to calculate the first information, and acquires or calculates the second information; and a determiner configured to determine whether the electric power of the main battery is usable, the battery monitoring unit is configured to acquire or calculates the second information upon the start-up of the electric vehicle, and calculate the first information after acquiring or calculating the second information, and the determiner is configured to determine, upon the start-up of the electric vehicle, whether the electric power of the main battery is usable on a basis of the second information before the first information is calculated by the battery monitoring unit, and decide whether the electric power of the main battery is usable on a basis of the first information when the first information is calculated by the battery monitoring unit.

18. The control apparatus of the electric vehicle according to claim 1, wherein the monitor determiner includes:
a battery monitoring unit configured to calculate the first information, and acquires or calculates the second information; and
a determiner configured to determine whether the electric power of the main battery is usable,
the battery monitoring unit is configured to calculate, upon the start-up of the electric vehicle, provisional first information on a basis of the second information, and calculate the first information after calculating the provisional first information, the provisional first information being the first information that is provisional,
the determiner is configured to determine, upon the start-up of the electric vehicle, whether the electric power of the main battery is usable on a basis of the provisional first information before the first information is calculated by the battery monitoring unit, and decide whether the electric power of the main battery is usable on a basis of the first information when the first information is calculated by the battery monitoring unit.

19. A control apparatus of an electric vehicle, the control apparatus comprising:
circuitry configured to:
monitor a state of a main battery that supplies electric power directed to running,
determine whether the electric power of the main battery is usable on a basis of first information and second information, the first information being a deciding factor that is directed to deciding whether the electric power of the main battery is usable, the second information being a determination factor that is directed to determining whether the electric power of the main battery is usable,
determine, upon start-up of the electric vehicle, whether the electric power of the main battery is usable on the basis of the second information before the first information is calculated, and
decide whether the electric power of the main battery is usable on the basis of the first information when the first information is calculated.

20. A mode-selecting system for an electric vehicle, comprising:
a control unit that determines whether electric power of the main battery of the electric vehicle is usable, the control unit:
determining whether the electric power of the main battery is usable based on first information that is a deciding factor in deciding whether the electric power of the main battery is usable; and
prior to the determining based on the first information, determining whether the electric power of the main battery of the electric vehicle is usable based on second information that is a determination factor in determining whether the electric power of the main battery is usable; and
a mode selector that selects a mode of the electric vehicle based on a determination of the control unit.

* * * * *